United States Patent Office 3,455,782
Patented July 15, 1969

3,455,782
NONSTAINING PHENYLENEDIMETHYLENE - BIS-(TRIPHENYLPHOSPHONIUM) SALT - INACTIVATED HOG CHOLERA VIRUS VACCINE
Victor Jack Cabasso, Pearl River, Max Raymond Stebbins, Nanuet, and Everett Joseph Frazza, Yorktown Heights, N.Y., assignors to American Cyanamid Company, Stamford, Conn., a corporation of Maine
No Drawing. Filed Dec. 7, 1967, Ser. No. 688,665
Int. Cl. C12k 7/00; A61k 23/00
U.S. Cl. 195—1.4                                           4 Claims

ABSTRACT OF THE DISCLOSURE

The provision of a non-staining inactivated hog cholera vaccine prepared by treating live hog cholera virus with a phosphonium compound of the Formula I:

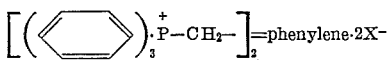

wherein X represents an anion.

---

This invention relates to the provision of an inactivated hog cholera vaccine and to a method of preparing this vaccine.

Hog cholera is a septicemic disease characterized by severe symptoms after a post-infection incubation period of from 4 to 5 days. It produces high fever, inflammatory swelling of the conjunctiva and lymph glands, and numerous hemorrhagic lesions occurring generally over the body. The disease is frequently compricated by secondary infections from other microorganisms such as Salmonella and Pasteurella. A hog cholera attack can cause disaster where it strikes the pork industry since mortality rates are high. Even when pigs survive, they are an economic loss since they do not give meat fit for consumption.

Live hog cholera vaccines, such as are described in U.S. Patent 2,518,978, have proved quite effective in the control of this disease and progress is being made toward its eradication. However, in recent years, the United States Department of Agriculture has instituted a program for the eventual replacement of live virus vaccines with only inactivated virus vaccines.

At the present time an inactivated hog cholera vaccine is available which is prepared by treating hog cholera virus in blood isolated from an infected animal, with crystal violet. In preparing the vaccine, it is essential that the virus be so treated that its power to produce the disease is destroyed (inactivated), while its power to stimulate the production of antibodies (antigenicity) is left comparatively unimpaired. The treatment of the virus in the blood with crystal violet, consists of incubating the blood containing the crystal violet for a number of days at a particular temperature. For instance, a hog cholera vaccine may be obtained using one part of a 0.25% solution of crystal violet in a suitable solvent such as glycerol, ethylene glycol and the like with 4 parts of infected blood and incubating for from 6 days to 2 weeks at 37° C.

Crystal violet, which is chemically methyl-rosaniline chloride, and has the following structure (II):

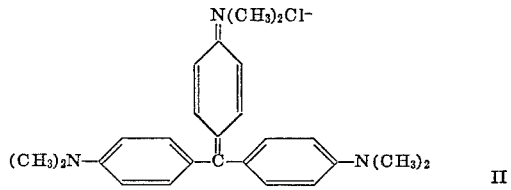

is a dark green powder which yields intensely purple aqueous solutions.

Although the inactivated vaccine made from crystal violet is effective in producing protective antibodies against hog cholera after a pig is vaccinated, it does have the serious disadvantage of staining the meat of the pig at the site of vaccination. This stain varies in size and intensity, but it does remain on the pork meat after slaughter and processing. This is undesirable for aesthetic reasons and also because of the increasingly more stringent regulations in the inspection of pork for consumption. Rejection of meats lead to economic loss to the farmer and eventual higher costs for the consumer.

Many chemical inactivating agents are known. Some of the more common ones are ethylene oxide, phenol, $\beta$-propiolactone, formaldehyde, etc. These known agents which do not stain, have not been found capable of producing a safe and effective inactivated virus vaccine from live hog cholera virus and there is thus a need for an agent useful in producing an effective inactivated virus vaccine which will not stain the meat of the treated pig.

Accordingly, it is an object of this invention to produce a safe and effective inactivated hog cholera vaccine by chemical means, which vaccine does not stain the pork muscle upon vaccination.

It is a further object of this invention to produce an inactivated virus vaccine which is at least as safe and effective as the presently available crystal violet hog cholera vaccine.

According to the present invention, these and other objects are accomplished by treating live hog cholera virus with an effective quantity of a non-staining triaryl phosphonium salt which will be hereinafter described.

The method used for obtaining an effective inactivated hog cholera vaccine with crystal violet can also be used with the phosphonium salt of this invention to produce a vaccine. Thus, the virus in the isolated blood of an infected animal is treated with a solution of the phosphonium salt in a solvent such as ethylene glycol or an equivalent, and the treated blood is then incubated for a given period at a given temperature, to produce a potent vaccine.

As in the case with crystal violet, it is possible to under-inactivate or overinactivate the virus to render an ineffective vaccine in either case. Underinactivation would result in a product which would be capable of producing the disease. Overinactivating the virus would render it useless as a vaccine.

The phosphonium compounds useful in the present invention are phenylenedimethyl - bis(triphenylphosphonium) salts represented by the following Formula I:

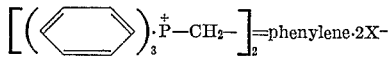

I wherein X is an anion of a pharmaceutically acceptable acid. Among the preferred compounds of Formula I are those wherein the phosphonium moieties are substituted in 1.4-positions of the phenylene nucleus and the anion is a halide (e.g., a bromide). A preferred compound is depicted by the following Formula III:

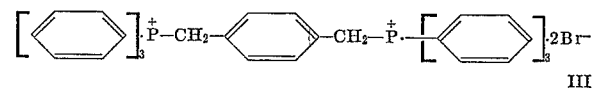

III

The following examples are presented to further illustrate this invention.

EXAMPLE 1

Preparation of vaccine

Pooled blood was prepared by mixing defibrinated whole blood from six cholera-infected hogs. One 200 ml. sample of pooled blood was treated with 50 ml. of a 0.25% ethyleneglycol solution of p-phenylenedimethylene-bis(triphenylphosphonium)dibromide and other 200 ml. sample of pooled blood was treated with a 0.25% ethylene glycol solution of crystal violet. The samples were incubated at room temperature for 7 days with periodic stirring and then worked up to give the vaccines used in the following examples.

The procedure used in the foregoing example can be varied as to concentration of the inactivating agent, choice of solvent, and time and temperature of incubation, depending on the virulence of the virus. Greater degrees of inactivation result from increased concentration of inactivating agent, and when incubation is carried out at higher temperatures and for longer periods. The conditions should be adjusted so that after incubation the virus is sufficiently inactivated not to be capable of producing hog chlorea, but not so overinactivated as to be incapable of providing immunity.

EXAMPLE 2

Testing for virus inactivation

Each vaccine of Example 1 was intramuscularly administered to two normal pigs, using 4.0 ml. of inoculum. Daily temperature readings were taken for a 26-day period. Hog temperatures were found to be normal, indicating complete inactivation of the infectious virus used for vaccine production. At the same time two normal pigs were inoculated intramuscularly with 2.0 ml. of the defibrinated whole blood used in Example 1 for vaccine preparation and both of these pigs succumbed on the 10th day with typical hog cholera symptons and lesions at necropsy.

EXAMPLE 3

Tests of vaccine activity

Each of the two vaccines prepared in Example 1 was inoculated intramuscularly into two normal pigs, using 4.0 ml. of inoculum. Daily temperature readings were takn. None of the pigs showed any untoward reactions to vaccination.

The vaccinated pigs plus three challenge controls were inoculated with 2.0 ml. of the AIQ standard challenge virus. All vaccines survived challenge, while the three controls were sacrificed on the 10th day with typical signs of hog cholera. Although the vaccinates survived challenge, the two pigs inoculated with the crystal-violet preparation did show some reaction to the challenge virus over a 4–5 day period.

While the vaccine prepared by crystal-violet inactivation was effective in providing immunity to the animals, it produced a violet stain in the flesh surrounding the point of vaccination. The vaccine prepared by the present invention was also effective in providing immunity and it did not produce any staining of the hog flesh at the point of vaccination.

What is claimed is:

1. Hog cholera vaccine prepared by the inactivation of live hog cholera virus with an effective amount of a compound of the formula:

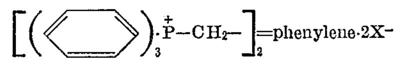

wherein X is an anion.

2. The vaccine of claim 1 wherein the compound is p - phenylenedimethylene - bis(triphenylphosphonium)dibromide.

3. A method of producing the inactivated hog cholera vaccine of claim 1 which comprises incubating live hog cholera virus in a suitable medium with an effective amount of a comopund of the formula:

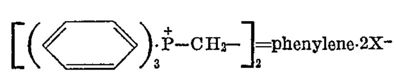

wherein X is an anion.

4. The method of claim 3 wherein the compound is p - phenylenedimethylene - bis(triphenylphosphonium)dibromide.

References Cited

UNITED STATES PATENTS 3,364,107 1/1968 Berenson et al. ------ 167—30

LEWIS GOTTS, Primary Examiner

S. K. ROSE, Assistant Examiner

U.S. Cl. X.R.

424—89